United States Patent [19]

Newkirk et al.

[11] Patent Number: 4,960,478

[45] Date of Patent: Oct. 2, 1990

[54] APPARATUS AND PROCESS FOR THE FUSION BONDING OF THERMOPLASTIC ARTICLES

[75] Inventors: Raymond K. Newkirk, Mound; David G. Holker, Robbinsdale, both of Minn.

[73] Assignee: Tape Inc., Minneapolis, Minn.

[21] Appl. No.: 49,598

[22] Filed: May 14, 1987

[51] Int. Cl.⁵ .................................................. B29C 65/20
[52] U.S. Cl. ..................................... 156/228; 156/304.2; 156/304.6; 156/309.9; 156/499; 156/580; 156/583.8
[58] Field of Search ............... 156/304.1, 304.2, 304.6, 156/309.9, 228, 499, 507, 583.8, 583.9, 580

[56] References Cited

U.S. PATENT DOCUMENTS

| | | | |
|---|---|---|---|
| Re. 30,130 | 10/1979 | Edwards | 425/453 |
| 266,602 | 10/1882 | Blum | 249/162 |
| 540,839 | 6/1895 | Maltby | 249/155 |
| 856,866 | 6/1907 | Hart | 249/140 |
| 1,455,353 | 5/1923 | Pettis | 249/112 |
| 1,545,937 | 7/1925 | Bonelli | 249/162 |
| 3,119,728 | 1/1964 | Janapol | 156/583.9 |
| 3,325,861 | 6/1967 | Pincus et al. | 425/89 |
| 3,391,045 | 7/1968 | Majonnier et al. | 156/304.2 |
| 3,846,525 | 11/1974 | Kinne et al. | 264/46.5 |
| 3,961,664 | 6/1976 | Ward | 164/343 |
| 4,146,420 | 3/1979 | Newkirk | 156/499 |
| 4,516,971 | 5/1985 | Spencer | 156/304.2 |
| 4,764,235 | 8/1988 | Hazama et al. | 156/228 |

Primary Examiner—Michael Wityshyn
Attorney, Agent, or Firm—Orrin M. Haugen; Thomas J. Nikolai; Frederick W. Niebuhr

[57] ABSTRACT

An apparatus for heat sealing thermoplastic articles includes a heater movable reciprocably in a longitudinal direction, and two opposed transversely reciprocable and pivotable carriers, each supporting a thermoplastic workpiece to be bonded. Two opposed heating surfaces of the platen heater are inclined and diverge in the longitudinal direction, to give the heater a "V" configuration. The carriers may be pivoted to a corresponding "V" configuration to position each workpiece against an associated heating surface of the platen. Following heating of the workpieces, pneumatic or other force applying cylinders urge the carriers toward one another as the heater is withdrawn from between them. Cam surfaces on the heater cooperate with cam following rollers on the carriers to control the position of the carriers during withdrawal of the heater, and permit rapid and accurate engagement of the thermoplastic articles after withdrawal.

11 Claims, 4 Drawing Sheets

APPARATUS AND PROCESS FOR THE FUSION BONDING OF THERMOPLASTIC ARTICLES

BACKGROUND OF THE INVENTION

This invention relates to the fusion bonding of thermoplastic articles, and more particularly to an apparatus and process employing platens having obliquely positioned surfaces to heat and fuse thermoplastic articles immediately prior to their joinder.

Fusion bonding, also known as heat sealing or hot plate welding, is frequently employed to form unitary manufactured parts from two or more constituent parts. The process involves heating the separate constituents, particularly along their bonding surfaces, then positioning them against one another with their respective bonding surfaces arranged in face-to-face relationship. The constituent parts are held together, usually under pressure, until the abutting surfaces solidify and the fusion bond is complete.

An apparatus particularly well adapted for fusion bonding of multiple elements is shown in U.S. Pat. No. 4,146,420 to Newkirk, granted Mar. 27, 1979, and assigned to the assignee herein. The apparatus includes two opposed rotatable workpiece carriers which transfer workpieces to be joined in rotary step-by-step motion, from a pair of loading stations to a heating station where surface portions are fused, and then to a bonding station where the individual fused surface portions are solidified and joined. A heating element is reciprocated with each incremental rotation of the workpiece carriers so as to permit the heating element surface to come into close proximity with the surfaces of the workpieces being bonded. As a consequence of undertaking multiple steps or operations simultaneously at different locations, the bonding of multiple parts is more rapid.

The presently disclosed apparatus is readily adapted to the high precision bonding of certain thermoplastic parts, including the bonding of parts consisting of foam thermoplastic parts such as expanded polystyrene or the like. The apparatus is also readily adapted to other applications where it is desired to reduce, diminish, or eliminate the seam between the previously individual or separate constituents. The present arrangement finds application whenever there is a requirement for more precise control over the temperature of individual constituents, particularly at their bonding surfaces, and a need to more precisely control the manner in which the heating platen or other heating member is withdrawn or removed from proximity with a constituent bonding surface immediately following the heating operation.

Therefore, it is an object of the present invention to provide an apparatus for the fusion bonding of thermoplastic articles which affords greater control over the temperature to which the surfaces of articles to be bonded are heated, particularly at or along their bonding surfaces and thus contributes to the production of more dimensionally accurate articles.

Another object of the present invention is to provide a process and apparatus for minimizing the time lapse between the fusion and bonding steps of a heat sealing cycle.

Another object is to provide a fusion bonding apparatus configured to reduce movement of convection cooling air currents at or around the bonding surfaces of thermoplastic articles about to be joined after fusion.

Yet another object is to provide an apparatus and method for bonding thermoplastic articles along an optimally smooth seam at the fusion region, thus reducing the size of any surface interruption at the fusion region through elimination of the creation of a noticably visible seam between the bonded articles, and further eliminating the need for separate bonding agents such as, for example, hot melt adhesives or the like.

SUMMARY OF THE INVENTION

To achieve these and other objects, there is provided an apparatus for the fusion bonding of thermoplastic articles The apparatus includes a frame having a central longitudinal axis. First and second article support members are movably mounted with respect to the frame and support, respectively, first and second thermoplastic articles in opposed relation and on opposite sides of a fusion plane which extends generally along the longitudinal axis. Each of the thermoplastic articles is held in a predetermined or selected orientation with respect to its associated article support member. An article heating member comprises a generally wedge shaped platen with two heated surfaces for the simultaneous heating and fusion of surface portions of articles to be bonded together. The heated surfaces are positioned on opposite sides of and in a select orientation with respect to the fusion plane, with the fusion plane being generally coincidental with the longitudinal axis of the platen. A heater moving means reciprocates the platen or heating member along its longitudinal axis between first and second positions intermediate to the article support members. A first article moving means, drivably associated with the first support member, reciprocate the first thermoplastic article along a path toward and away from the fusion plane. This article moving means further arcuately pivots the first support member about an axis generally normal to the longitudinal axis between a first or opened position and a second or closed position. In the first or opened position, the first article is substantially aligned with the first heating surface of the wedge shaped platen, while in the second or closed position, the first bonding surface becomes substantially aligned with the fusion plane. A second article moving means, drivably associated with the second article support member, reciprocates the second thermoplastic article toward and away from the fusion plane, and further arcuately pivots the second support member about an axis parallel to the pivot axis of the first support member and also normal to the longitudinal axis between a first or opened position wherein the bonding surface of the second article is substantially aligned with the corresponding heating surface of the platen, and a second or closed position wherein the bonding surface is substantially aligned with the longitudinal axis or fusion plane. The heater member, when in its first heater position, is disposed between the first and second article support members, and thus adapted to heat and ultimately fuse surface portions of articles held within the respective support members.

The apparatus of the present invention further includes a guide means between the heating member and the article support members for limiting movement of the thermoplastic articles towards one another and towards their closed positions responsive to the force of the article moving means. This arrangement enhances the dimensional accuracy of the finished articles, since the bonding surface of each of the thermoplastic articles is positioned or aligned against its associated heating surface when the heating member is in its forward position. This permits a controlled and rapid movement of each thermoplastic member toward the fusion plane and toward its closed position responsive to the force of its associated article moving means as the heater member moves from its active heating position Each of the thermoplastic articles is moved inwardly toward its closed position so as to place the bonding surfaces in contiguous abutting relation for bonding.

The preferred means for reciprocating the heater member and for reciprocating and pivoting the article support members are a plurality of extensible and retractable drive members. In this connection, the drive means selected may be any of a variety of extensible and retractable drive members such as, for example, fluid pressure activated cylinders, lead screw devices, or the like. Fluid pressure activated cylinders are readily available and readily adapted to this system, however. The fluid pressure actuated cylinders may be either hydraulic or pneumatic, with pneumatic cylinders being generally preferred, it being understood that other actuators may be more readily suited to one specific application or another. For pivoting of the support members and mutual closure of the pair, each support member is connected pivotally to a plate through a bracket. In the apparatus illustrated in this application, two separate forms of motion are contemplated for closure of the system. In this connection, an intermediate fluid pressure actuated cylinder, preferably a pneumatic cylinder, is connected between the support member and plate, thus to provide the pivotal motion of the support member. Another cylinder is connected between the plate and frame to provide the reciprocable motion of the plate between the plate and the support member. In this specific arrangement, linear motion is utilized for driving of both actuation steps or operations The position of the support members relative to the heater member can be precisely controlled by cam and cam follower means. More particularly, a cam plate integral with the heating member has first and second camming surfaces extending generally parallel to the first and second surfaces of the heating platen. Cam followers in the form of rollers rotatably mounted on the first and second support members, are positioned to contact the first and second camming surfaces to guide the movement and prevent travel of the support members in a direction toward the heater member beyond the position determined by the rollers and camming surfaces. Furthermore, as the heating platen is withdrawn from its heating position, the movement of the support members is precisely controlled and guided by the rollers and camming surfaces, with force for the movement being provided by the individual driving means such as the pneumatic cylinders closing the support members upon each other.

In one preferred application, the longitudinal axis is horizontal and the fusion plane is vertical. The first and second heating surfaces are disposed generally upright and meet or converge at an apex at the forward end of the heating member. These surfaces in turn diverge away from each other and from the fusion plane to define the overall wedge shaped or "V" configuration for the heating member.

Another aspect of the present invention is directed to a process for the fusion bonding of thermoplastic articles, including the following steps or sequential operations:

Step (1) supporting first and second thermoplastic articles in spaced apart relation on opposite sides of a longitudinally disposed fusion plane;

Step (2) positioning first and second heating surfaces on opposite sides of the fusion plane and between the exposed surfaces of the first and second thermoplastic articles, with these exposed surfaces being in angular inclined relation to the fusion plane, and wherein these exposed surfaces are disposed generally proximate each other at their forward ends, and diverging from one another in a rearward direction;

Step (3) positioning the exposed surfaces of the first and second thermoplastic articles against the first and second heating surfaces of the wedge shaped platen, with each exposed surfaces becoming a bonding surface for each thermoplastic article when these surfaces become fused and are brought into mutual engagement;

Step (4) transferring thermal energy from each heating surface to its associated thermoplastic article while the surfaces of the thermoplastic articles and the heating surfaces are maintained in mutual engagement during a dwell period;

Step (5) following heating and fusion of the thermoplastic articles along their surfaces, the wedge shaped heating platen is moved longitudinally away from its location between the thermoplastic articles, with this motion being accompanied by simultaneous movement of the articles toward one another until the surfaces of the wedge shaped platen are free of the thermoplastic articles to be bonded and the articles are moved pivotally inwardly until they engage one another along their respective fused bonding surfaces; and Step (6) maintaining the thermoplastic articles in contact with one another until cooling occurs and fusion bonding is complete.

Fusion bonding in accordance with the apparatus and process of the present invention has been found to function exceptionally well with foam thermoplastic articles, such as expanded polystyrene or the like. This process has further been found to repeatedly produce accurate fusion bonds of consistently high quality and minimal surface interruption along the "seam" or bonding line. Increased consistency of bonding temperatures results from reduced exposure to ambient air or convection currents flowing along the bonding surfaces, with considerably less time being required between the heating and bonding steps as compared to prior bonding methods. Other possible factors contributing to the advantageous results achieved in the present invention are believed to include the oblique separation of the surfaces of the heating platen from the fused surfaces of the articles being bonded following the heating operation. The controlled manner in which this surface separation occurs is due primarily to the cam and roller arrangement and to the manner in which these components control the relative motion. Consistently superior quality in heat sealed articles along with dimensionally accurate articles is achieved by utilization of the present apparatus and process.

IN THE DRAWINGS

The above and other features and advantages are more readily appreciated upon review of the following detailed description and consideration of the drawings, in which.

DETAILED DESCRIPTION OF THE PREFERRED EMBODIMENT

Figure 1:
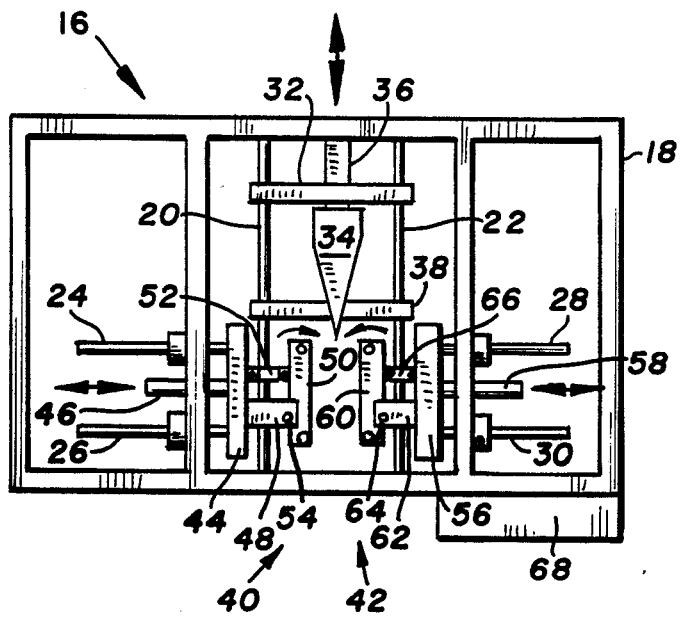
FIG. 1 is a top plan view of a fusion bonding apparatus constructed in accordance with the present invention.

Turning now to the drawings, there is shown in FIG. 1 a heat sealing device 16 adapted for the fusion bonding of thermoplastic workpieces, including foamed thermoplastic workpieces. Heat sealing device 16 includes a frame 18, and a plurality of longitudinal rails 20 and 22 are fixed to the frame. A pair of transverse rails 24 and 26, and opposite transverse rails 28 and 30, slide relative to the frame. A carriage 32 is mounted slidably on longitudinal rails 20 and 22, and supports a heater 34. A pneumatic cylinder 36, connected between carriage 32 and frame 18 and oriented in the longitudinal direction, is extensible and retractable to reciprocate the carriage and heater along a longitudinal axis at about the center of frame 18. A cross-bar 38 is mounted to rails 20 and 22 forwardly of heater or platen 34, or downwardly as viewed in FIG. 1.

On opposite sides of a vertical plane including the longitudinal axis, here designated as a fusion plane, are a pair of opposed workpiece support assemblies 40 and 42, each supporting a workpiece for pivotal and transverse movement with respect to frame 18. Assembly 40 includes a rigid panel 44 fixed to transverse rails 24 and 26, and thus reciprocable transversely of frame 18 toward and away from the fusion plane. A transversely disposed pneumatic cylinder 46, connected between panel 44 and frame 18, reciprocates the panel to linearly advance and retract a workpiece toward and away from the fusion plane. Mounted pivotally with respect to panel 44, through a bracket assembly 48, is a box-like carrier 50 for supporting one of the workpieces to be bonded. An intermediate pneumatic cylinder 52 is connected between carrier 50 and panel 44, and is extensible and retractable to rotate the carrier, with respect to the panel, about a vertical axis as indicated at 54. As indicated earlier, other types of drives may be employed to provide the linear motion required, it having been found, however, that pneumatic cylinders are preferred in this particular embodiment.

The opposed workpiece support assembly 42 is substantially identical. A panel 56 is fixed to transverse rails 28 and 30, with a transverse pneumatic cylinder 58 connected between panel 56 and frame 18 to reciprocate the panel in the transverse direction relative to the frame. An opposed workpiece carrier 60 is mounted pivotally to a bracket assembly 62 at pivot point 64, and the bracket assembly is attached to the panel. An intermediate pneumatic cylinder 66 is connected between carrier 60 and panel 56 in order to pivot the carrier.

Figure 2:
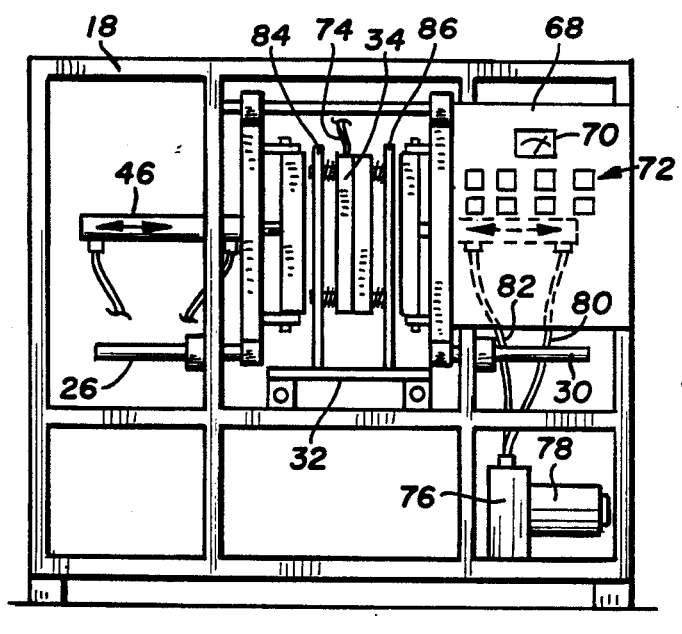
FIG. 2 is a front view of the apparatus of FIG. 1.
Figure 3:
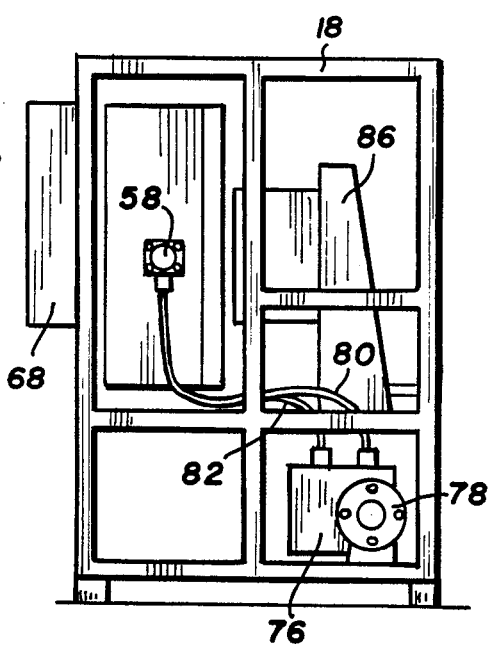
FIG. 3 is a side view of the apparatus.

As seen in FIG. 2, a control panel 68 mounted to frame 18 includes a temperature indicating gauge 70 and a plurality of push-buttons and indicator lights as generally indicated at 72. These elements of control panel 68 are utilized to predetermine operational parameters for a particular bonding process, as well as for monitoring the process and making adjustments if necessary. Typically, the temperature of heater 34 is controlled by electrical current supplied to resistive heating elements in the heater (not shown) along an electrical line 74. Further, timing controls are provided to ensure the sequential and properly timed actuation of the various pneumatic cylinders, through a controlled supply of air or other compressed fluid between a pump 76 operated by a motor 78 and the various cylinders, for example along compressed air lines 80 and 82 in connection with cylinder 58. Further details of such process control are not discussed, as they are known in the art and not particularly germane to the present invention. As seen in FIGS. 2 and 3, heater 34 is supported between two upright walls 84 and 86, which themselves are supported on carriage 32.

Figure 4:
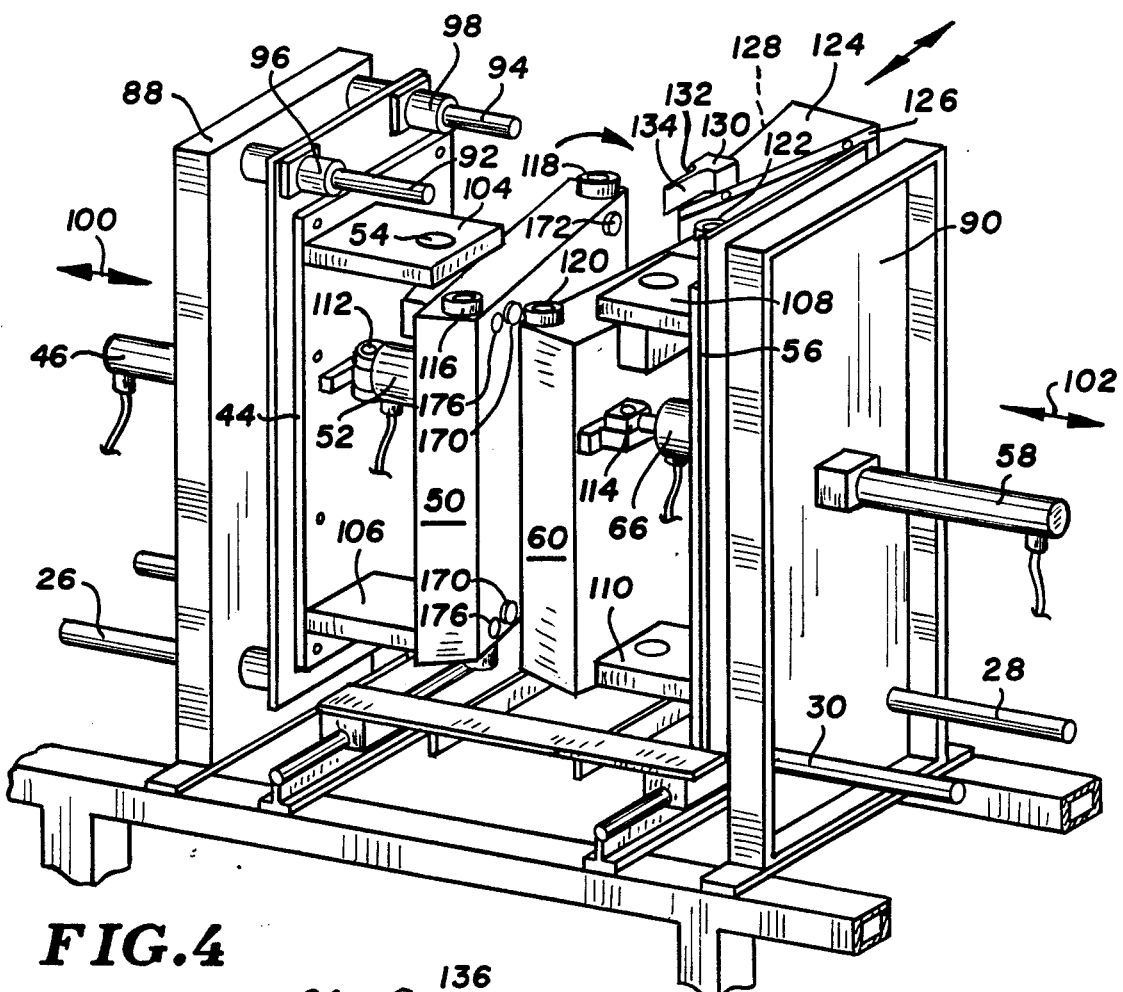
FIG. 4 is an enlarged perspective view of part of the apparatus.

The heater and opposed workpiece support assemblies are shown in greater detail in FIG. 4. First and second upright plates 88 and 90 are fixed to frame 18 on opposite sides of the fusion plane. A pair of transversely extended guide bars 92 and 94 span the distance between upright plates 88 and 90, and are slidably mounted with respect to panels 44 and 56. The bars cooperate with transverse rails 24 and 26 to guide transverse movement of panel 44, and similarly cooperate with transverse rails 28 and 30 to control movement of panel 56. The guide bars are slidably contained in cylindrical sleeves 96 and 98, and substantially similar sleeves (not shown) surround the bars at panel 56. Transverse movement of the panels, indicated by arrows at 100 and 102, is controlled by pneumatic cylinders 46 and 58.

Bracket assembly 48 includes an upper bracket 104 and a lower bracket 106, both fixed to panel 44 and pivotally supporting carrier 50 as indicated at 54 for the upper bracket. The opposing bracket assembly 62 is similar, including an upper bracket 108 and a lower bracket 110 fixed to panel 56 and pivotally supporting carrier 60.

Intermediate pneumatically operated cylinders 52 and 66 are pivotally mounted, each to its associated panel at its larger end as indicated at 112, and to its associated carrier at its rod end, as is shown at 114. A forward cam follower in the form of roller 116 and a rearward cam follower or roller 118 are mounted for rotation adjacent the top of carrier 50. A corresponding forward roller 120 and rearward roller 122 are similarly mounted to the top of carrier 60.

Platen heater 34 includes a heater plate 124 of generally triangular configuration, with opposed side edges 126 and 128 converging gradually and in a forward direction. Edges 126 and 128 of the heater plate provide first and second cam surfaces for rollers 118 and 122, respectively. Mounted at the forward end of upper plate 124 is a block 130, in which is formed opposing roller guide surfaces 132 and 134 that cooperate with edges 126 and 128 in positioning carriers 50 and 60 with respect to the heater.

Figure 5:
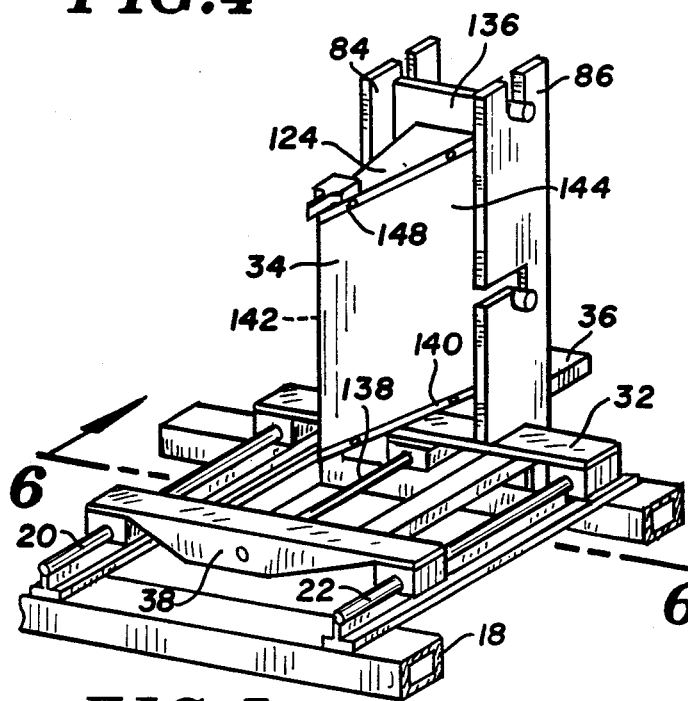
FIG. 5 is an enlarged perspective view showing a heater of the apparatus.

As seen in FIG. 5, platen heater 34 is fixed to a backing plate 136, which in turn is supported between upright heater support walls 84 and 86 fixed to carriage 32 to move with the carriage on longitudinal rails 20 and 22. As cylinder 36 is extended, a rod 138 attached to cross-bar 38 is extended, in effect forcing or pushing carriage 32 and the heater rearwardly or farther away from bar 38. Retraction of cylinder 36 has the opposite effect, pulling the carriage toward the bar.

Figure 6:
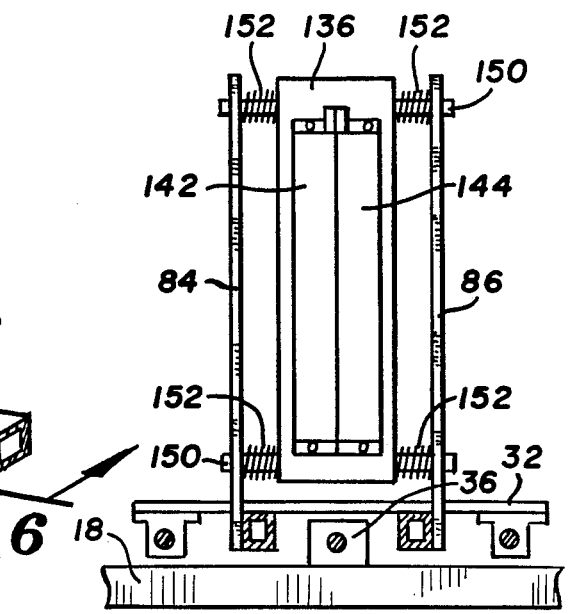
FIG. 6 is a sectional view taken along the line 6—6 in FIG. 5.

As seen from FIGS. 5 and 6, a lower heater support plate 140 cooperates with upper heater support plate 124 to define the triangular or "V" configuration of a heater. Two upright heater platens 142 and 144 are supported between upper and lower panels 124 and 140 by a plurality of bolts 146 (FIG. 7) threaded through spacers 148 along the top and bottom edges of the platens. A plurality of transverse rods 150 at the upper and lower end portions of backing plate 136 support the backing plate with respect to walls 84 and 86. Corresponding springs 152-152 surround the rods, thus tending to maintain the backing plate and heater centered on the fusion plane, while permitting limited transverse movement.

Figure 7:
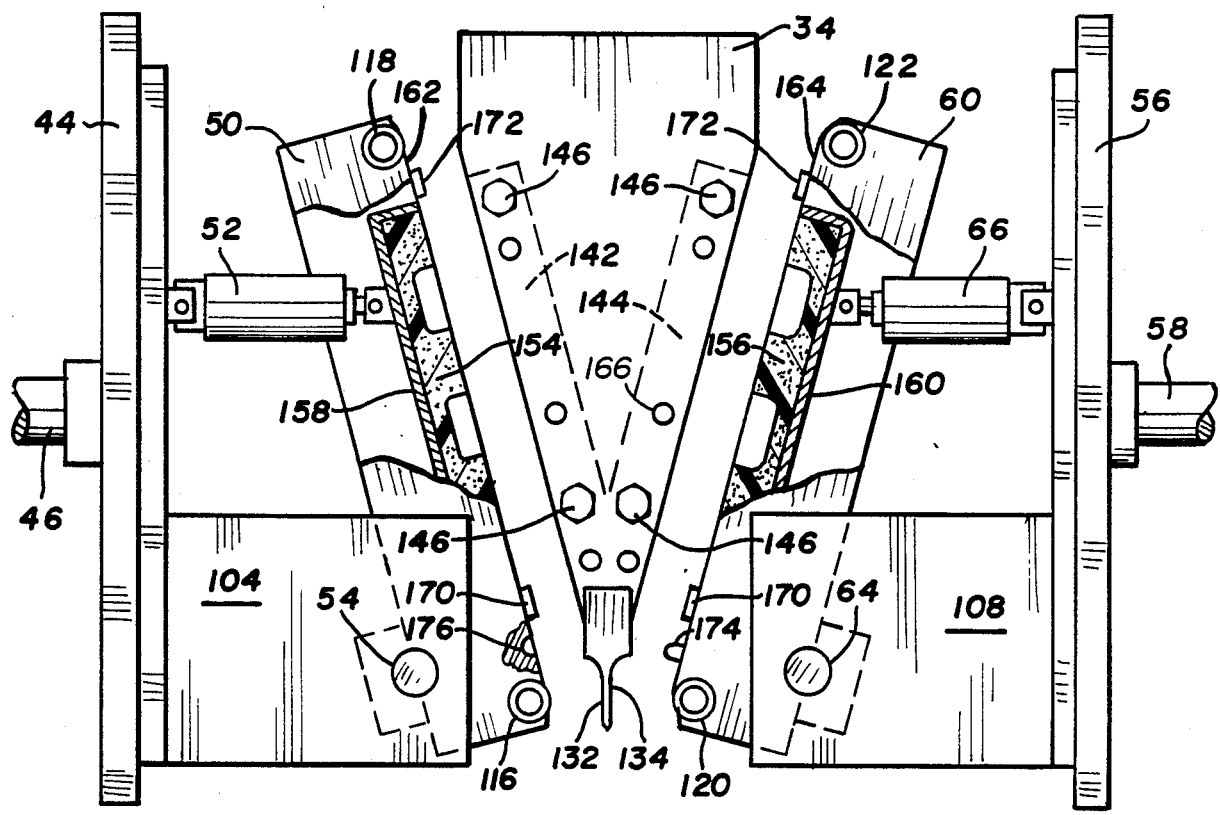
FIGS. 7-10 are top plan views showing the heater and workpiece carriers of the apparatus in various stages of the fusion bonding process.

FIGS. 7-10 illustrate successive stages in a heat sealing or fusion bonding operation undertaken on a pair of thermoplastic articles or workpieces 154 and 156 so as to form a unitary product. At the beginning of the cycle, as illustrated in FIG. 7, carriers 50 and 60 are in a retracted and open position. In other words, transverse cylinders 46 and 58 are retracted so that panels 44 and 56 are at their maximum separation from one another, and intermediate cylinders 52 and 66 are retracted as well, each to position its associated tool at least approximately in alignment with its associated one of heater platens 142 and 144, each of which is upright but also inclined with respect to the fusion plane, preferably at an angle of 15°. Part of each carrier has been cut-away to reveal inner casings 158 and 160, each having a configuration corresponding to the exterior surface of its associated one of workpieces 154 and 156, so that each workpiece is securely positioned within its associated one of the carriers, in a select orientation relative to the associated carrier. More particularly, the bonding edge or surface of each workpiece is substantially planar, and lies within the inside surface plane of the associated carrier when properly held in the carrier. In other words, the bonding surfaces of workpieces 154 and 156 lie in vertical planes along carrier edges 162 and 164 in FIG. 7, each at least approximately parallel to the plane of the associated heater platen.

During the initial stage of heat sealing, heater 34 is advanced forward, or downward as viewed in FIG. 7, to a position between carriers 50 and 60. With the heater at least approximately in its desired advanced position, cylinders 46 and 58 are extended to move panels 44 and 56 toward one another, bringing the carriers into contact with heater 34. In particular, rollers 116 and 120 are moved against roller guide surfaces 132 and 134, and the bonding surfaces of workpieces 154 and 156 moved to surface engagement with heater platens 142 and 144, respectively. Each of intermediate cylinders 52 and 66 is extended a proper distance to achieve the surface engagement shown in FIG. 8. The distance which each of the cylinders 52 and 66 extends will vary depending upon the particular thermoplastic being bonded. Generally speaking, however, surface-to-surface contact is achieved between the workpiece and the surface of the platen heater.

Once surface engagement is achieved, heater platens 142 and 144 are heated through electric heating elements, powered by current supplied to the platens through openings 166 in upper plate 124. The precise time for heating and the temperature to which the bonding surfaces are heated can vary with the particular thermoplastic materials employed and the size and configuration of the workpieces. In general, the bonding surfaces are heated to a select temperature chosen to achieve fusion and thus facilitate immediate subsequent fusion bonding. The temperature required for fusion of a particular article will depend, of course, upon the composition of the material from which the article is made. Generally, however, temperatures may range from as low as 300° F. up to about 900° F.

Figure 8:
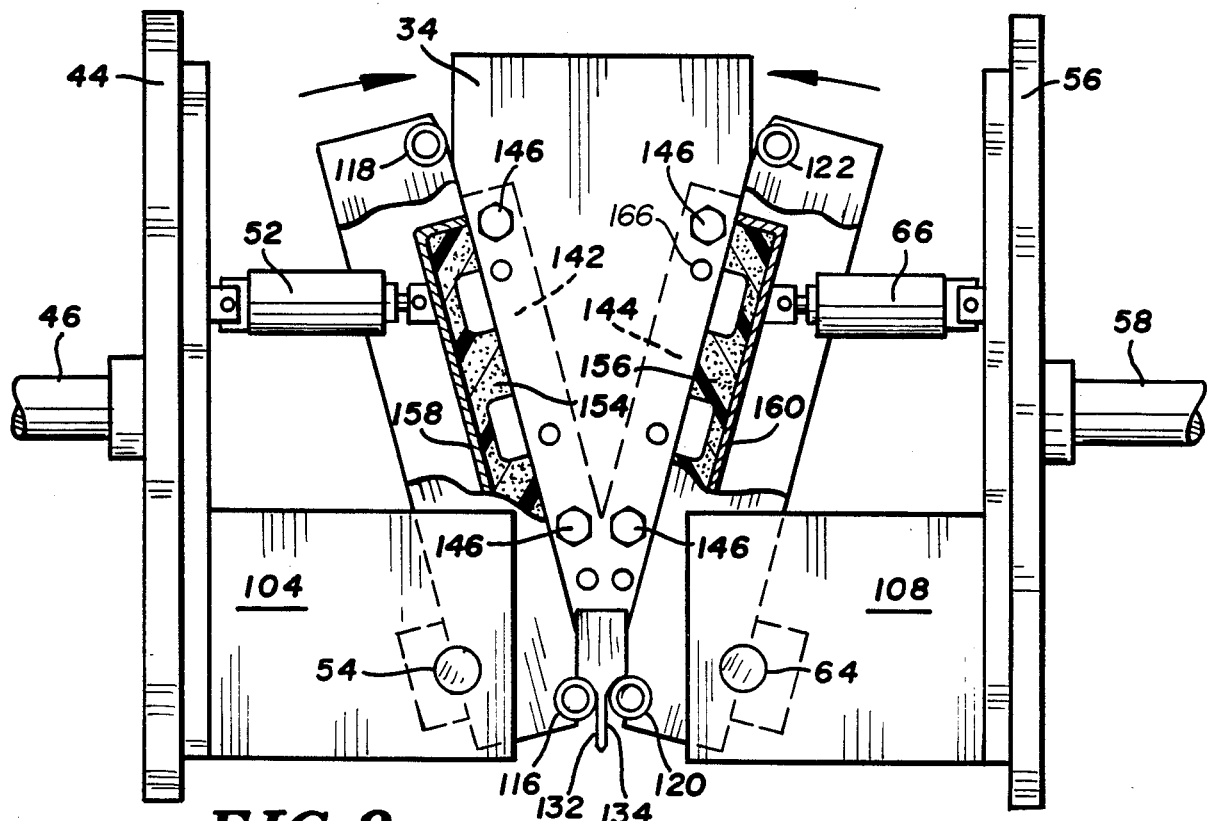
Figure 9:
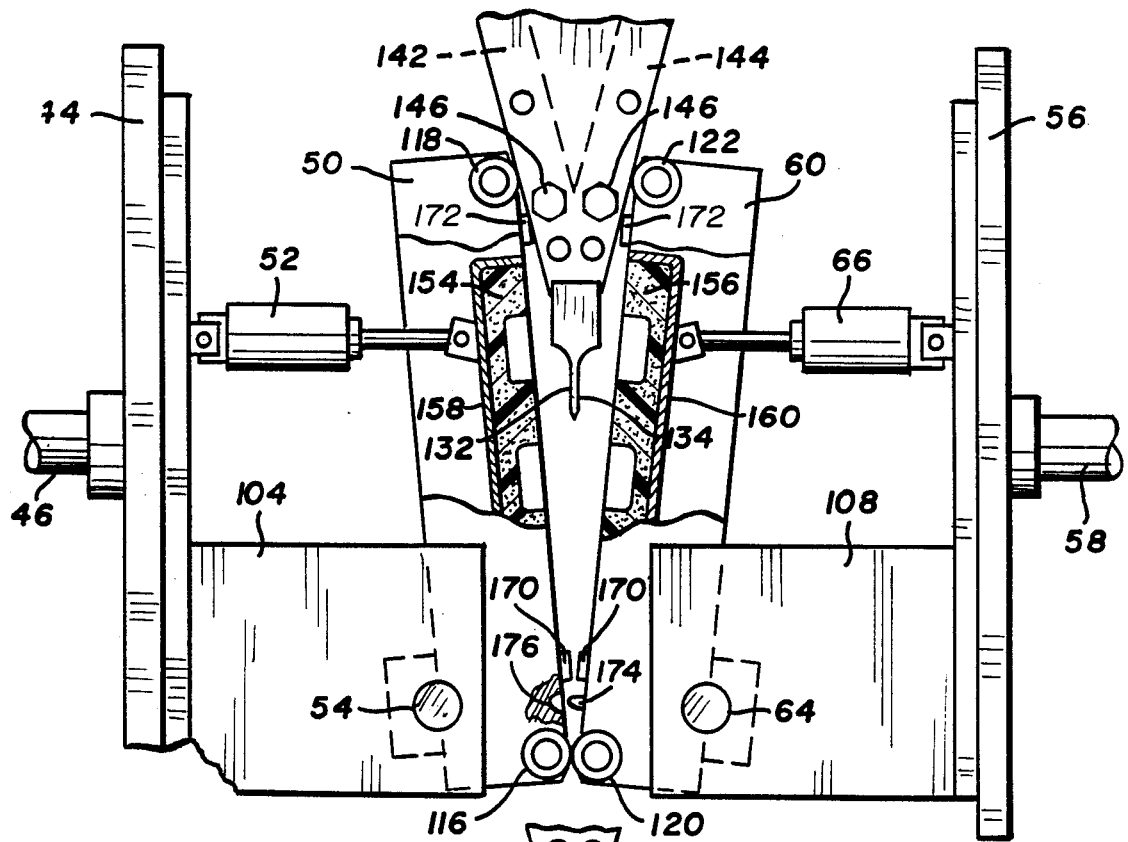

Following heating, heater 34 is retracted or moved upwardly as viewed in FIGS. 8 and 9. Significant features of the present invention reside in the manner in which the platens are removed from their associated workpiece bonding surfaces, and in the control of carriers 50 and 60 during heater withdrawal. The initial break-away of the platens from the fused bonding surfaces occurs upon movement of heater 34 backwards (upward as viewed in FIG. 8), with carriers 50 and 60 momentarily fixed. Consequently, with respect to the plane of each heating platen and associated bonding surface, break-away occurs at an oblique angle of about 15°.

Secondly, carriers 50 and 60 are not pulled transversely away from one another to accomplish the break-away. Rather, each carrier is continually biased toward its counterpart carrier by virtue of its associated transverse and intermediate cylinders. As a result, the carriers are pivoted inwardly toward one another, with the location of each carrier being determined by the interface of rollers 116 and 120 with each other, and the interface of rollers 118 and 122 with edges 126 and 128, respectively.

As heater 34 is withdrawn from between carriers 50 and 60, the transverse cylinders and intermediate cylinders remain biased inwardly, and thus act to continually urge the carriers toward one another. Consequently the carriers, each under the influence of its associated cylinders, are moved transversely inwardly and are also pivoted to their closed position, into surface engagement with one another, almost immediately upon complete withdrawal of the heater. At this point, the respective bonding surfaces of workpieces 154 and 156 are maintained in surface engagement, and under a selected pressure from the transverse and intermediate cylinders, for a selected time necessary for completion of fusion bonding.

In order to control the relative spacing of the individual platens during the bonding operation, a plurality of adjustable positive stops are provided so as to permit relative adjustment of the motion of the individual work support assemblies 40 and 42 toward each other. At the forward end of the support assemblies 40 and 42 there are positioned positive stops 170-170, and at the rearward end there are positioned stops 172-172. A total of four such stops will normally be provided for each of the workpiece support assemblies 40 and 42.

In order to control the positioning of the workpiece support assemblies 40 and 42 upon closure, the forward portions are provided with mating pins and sockets, with the pins being shown at 174 and the sockets at 176. These pins and sockets cooperate to controlablily position the individual workpiece support assemblies 40 and 42 upon closure.

Figure 10:
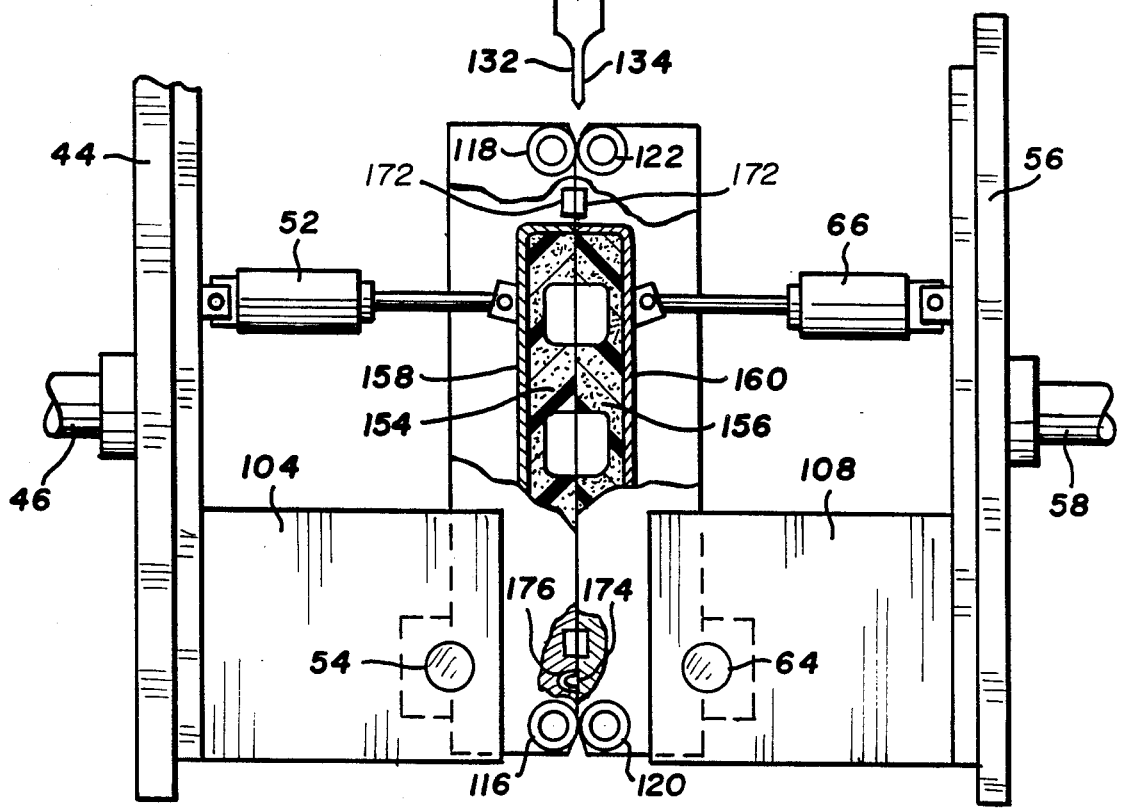

Upon consideration of the bonding cycle, particularly that part of the sequence including FIGS. 8-10, it can be appreciated that the spacing between carriers 50 and 60, following fusion and prior to bonding, is controlled to the minimum necessary to permit cooling of the bonding surfaces. This close spacing, together with rapid withdrawal of the heater plates and rapid closure of the carriers, minimizes exposure of the bonding surfaces to ambient air prior to contact while in fused condition, thus controlling the temperature as well as the fused condition with enhanced precision. Furthermore, the spacing between the carriers and the heater plates as the heater is withdrawn from between the workpieces is precisely controlled by the action of the cam following rollers as they are urged against the cam surfaces of upper support plate 124, and the corresponding lower support plate. Finally, the break-away of each of platens 142 and 144 from its associated workpiece bonding surface is uniquely clean, as it occurs obliquely—preferably at a 15° angle—with respect to the plane of the associated bonding surface. The result is a heat sealed article, composed of workpieces 154 and 156, having a uniform fusion bond extending along the entire bonded joint.

In order to summarize the individual steps which occur in the operation of the specific apparatus illustrated herein, the following explanation is given:

OPERATION 1

Parts are loaded into the assembly, with the jaws being arranged in full opened position. The part holding fixtures are also arranged in their full opened position.

OPERATION 2

The heater assembly is moved into its operative position intermediate the individual part-holding fixtures.

OPERATION 3

The jaws defining the part-holding fixtures are closed until there is surface-to-surface contact between the workpieces and the heater platen. The pivotal movement of the part-holding fixtures is stopped when the cam followers contact cam plates located along edges 126 and 128 of the heater plate.

OPERATION 4

Fusion of the surface portions of the thermoplastic workpieces occurs, with contact time of between about one second and 10 seconds being typically required, depending upon the requirements of the materials and the workpiece configurations.

OPERATION 5

The platen is retracted, and while this occurs, a continuing mechanical bias is placed on the pivot cylinders. This causes the part-holding fixtures to pivot inwardly toward each other while being forced against the cam plate. The main jaw cylinders are also moved toward each other during this phase of the operation.

OPERATION 6

Retraction of the platen continues until the jaws are completely closed against each other. The pivotal motion is complete, and the part-holding fixtures contact each other for positive location. The parts are permitted to cool to complete the formation of the fusion bond.

As indicated hereinabove, the time-temperature relationship for a typical fusion bonding process depends on a variety of parameters. Among these parameters are product configuration, the specific materials being bonded, the wall thickness of the areas being subjected to the fusion bonding operation, as well as the quality of the bonded joint such as joint appearance, joint strength, and hermetic sealing requirements, if any. By way of a typical example, however, an article fabricated from expanded polystyrene having a density of about 1.5 pounds per cubic foot, a bead size of about 0.060 inch to about 0.090 inch, and a wall thickness of approximately .090 inch at the bonding area is typically treated as follows:

| | |
|---|---|
| Platen temperature | 375° F. |
| Wall thickness at bond site | 0.08" to about 1" |
| Dwell time at platen | about 2 seconds |
| Time interval between removal from platen to product closure | about 0.8 second |
| Dwell time at seal station | 5 seconds |
| Fusion depth dimension from surface | about 0.035" |
| Compression squeeze at bonding site | 0.055" |
| Total displacement of assembly following bonding, typical | 0.180" |

Again, as indicated above, the time-temperature relationships vary depending upon the parameters set forth, however the parameters as indicated above have been found to be highly workable.

What is claimed is:

1. An apparatus for the fusion bonding of thermoplastic articles, including:
   a frame having a central longitudinal axis;
   first and second article support members movably mounted with respect to said frame for supporting, respectively, first and second thermoplastic articles in opposed relation and on opposite sides of a fusion plane including said longitudinal axis, and further with each of said thermoplastic articles in a select orientation with respect to its associated article support member;
   an article heating member and means forming first and second heating surfaces on opposite sides of and having a select orientation, with respect, to said fusion plane, and a heating member moving means for reciprocating said heating member along said longitudinal axis between forward and rearward heater positions with respect to said article support members;
   a first article moving means drivably associated with said first support member for reciprocating said first thermoplastic article toward and away from said fusion plane and for pivoting said first thermoplastic article between a first open position in which a first bonding surface of said first article is substantially aligned with said first heating surface, and a first closed position in which said first bonding surface is substantially aligned with said fusion plane;
   a second article moving means drivably associated with said second article support member for reciprocating said second thermoplastic article toward and away from said fusion plane, and for pivoting said second thermoplastic article between a second open position wherein a second bonding surface of said second article is substantially aligned with said second heating surface, and a second closed position wherein said second bonding surface is aligned with said fusion plane; and
   a guide means between said heating member and said article support members for limiting movement of said thermoplastic articles towards one another and towards said closed positions responsive to the force of their associated said article moving means to thus position the bonding surface of each thermoplastic article against its associated said heating surface when said heating member is in said forward position, and further to cause a controlled movement of each thermoplastic member toward said fusion plane and toward its closed position responsive to the force of its associated said article moving means as said heating member moves rearwardly, with each of said thermoplastic articles moving to its closed position to place said bonding surfaces in contiguous relation upon movement of said heating member to said rearward position.

2. The apparatus of claim 1 wherein:
said first and second heating surfaces are substantially planar and have an oblique orientation with respect to said fusion plane.

3. The apparatus of claim 1 wherein:
said heating member moving means includes a force applying drive cylinder connected between said heating member and said frame.

4. The apparatus of claim 1 wherein:
said first article moving means comprises a first panel, a first transverse force applying cylinder connected between said first panel and said frame for transversely reciprocating said first panel, a first mounting means for connecting said first support member pivotally with respect to said first panel, and a first intermediate force applying cylinder connected between said first support member and said first panel at a location spaced apart from said first mounting means.

5. The apparatus of claim 4 wherein:
said second article moving means comprises a second panel, a second transverse force applying cylinder connected between said second panel and said frame for transversely reciprocating said second panel, a second mounting means for connecting said second support member pivotally with respect to said second panel, and a second intermediate force applying cylinder connected between said second support member and said second panel at a location spaced apart from said second mounting means.

6. The apparatus of claim 5 wherein:
said guide means includes a camming surface and cam follower means acting between said heating member and said article support members.

7. The apparatus of claim 6 wherein:
said camming surface and cam follower means include a cam member integral with said heating member and having first and second cam surfaces parallel to said first and second heating surfaces, respectively; at least one first roller rotatably mounted with respect to said first support member and positioned to contact said first cam surface with said heating member being disposed between said support members and upon sufficient travel of said first support member toward said heating member; and at least one second roller mounted rotatably with respect to said second support member and positioned to contact said second cam surface with said platen heater member between support members and upon sufficient travel of said second support member toward said heating member.

8. The apparatus of claim 7 wherein:
said longitudinal axis is generally horizontal, and said heating member is generally upright, and said first and second heating surfaces are substantially upright, planar and positioned against one another at a forward end of said heater member, and diverge horizontally away from one another to define a generally "V" configuration for said heating member.

9. The apparatus of claim 1 wherein:
said heating surfaces are inclined at an angle of approximately 15° with respect to said fusion plane and converge toward one another in a forward direction.

10. A process for the fusion bonding of thermoplastic articles including the steps of:
supporting first and second thermoplastic articles in spaced apart relation on opposite sides of a fusion plane;
positioning first and second heating surfaces on opposite sides of said fusion plane and between said first and second thermoplastic articles, in an inclined relation to said fusion plane, with said heating surfaces at least proximate each other at forward ends thereof, and diverging from one another in a rearward direction;
positioning respective bonding surfaces of said first and second thermoplastic articles against said first and second heating surfaces, respectively, with the bonding surface of each thermoplastic article in surface engagement with its associated one of said heating surfaces;
transferring heat from each heating surface to its associated thermoplastic article while said articles and heating surfaces are so engaged, thereby causing the bonding surfaces of said articles to become fused;
following heating, moving said heating surfaces along a longitudinal axis in said fusion plane and away from between said thermoplastic articles, and simultaneously moving said articles toward one another until said heating surfaces are free of said articles and said articles engage one another along their respective fused bonding surfaces; and
maintaining said thermoplastic articles in contact with one another until bonding is complete.

11. The process of claim 10 wherein the step of moving said heating surfaces away from their location between said thermoplastic articles includes:
providing first and second cam surfaces integral with said first and second heating surfaces respectively; supporting at least one first roller rotatable with respect to said first thermoplastic article, and supporting at least one second roller rotatable with respect to said second thermoplastic article, with each roller positioned to engage an associated one of said cam surfaces when said heating surfaces and bonding surfaces are so engaged; and continually urging said first and second thermoplastic articles toward one another while so moving said heating surfaces longitudinally away from between said thermoplastic articles, thereby to determine the position of said thermoplastic articles by the engagement of said rollers with their associated cam surfaces.

* * * * *